Nov. 21, 1933.  N. J. GLABUS  1,935,707
TRACTOR HITCH
Filed Oct. 13, 1931
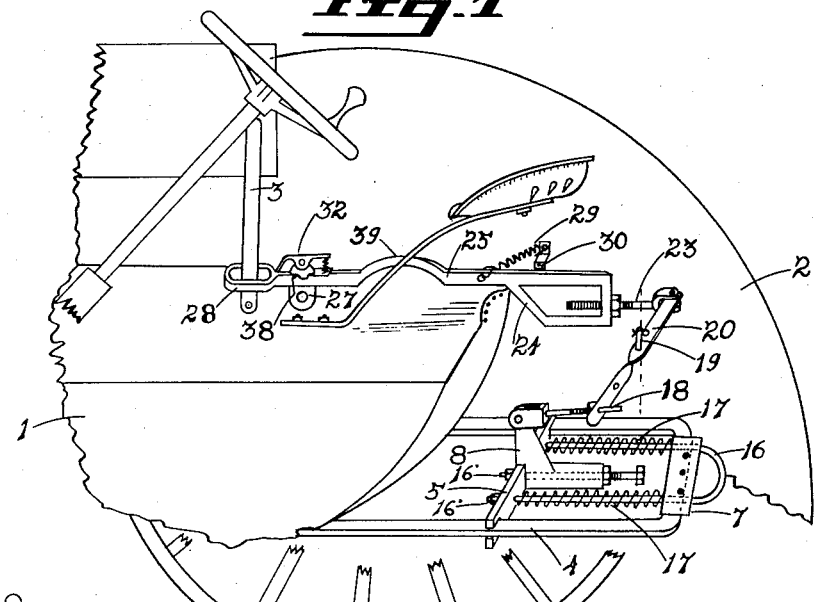
Fig.1
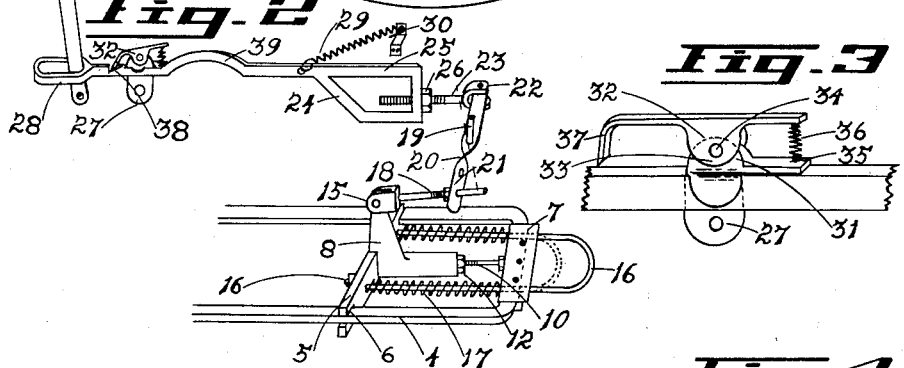
Fig.2  Fig.3  Fig.4
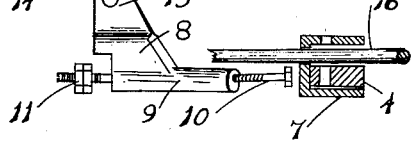
Inventor
Nick John Glabus
Per John W Mitchell
Attorney

Patented Nov. 21, 1933

1,935,707

UNITED STATES PATENT OFFICE 1,935,707

TRACTOR HITCH

Nick John Glabus, Lenora Lake, Saskatchewan, Canada

Application October 13, 1931. Serial No. 568,574

2 Claims. (Cl. 180—14.5)

My invention relates to tractor hitches, having particular reference to a combined tractor hitch and automatic clutch release. One of the objects of my invention is to provide a tractor hitch for use between the tractor and a trailing implement or vehicle, incorporating therein resilient means tensioned by the pull applied and automatically operative under a predetermined pulling influence to actuate a clutch release arm and release the tractor clutch to protect the tractor and implement from excessive strain and prevent injury thereto ordinarily resultant from such strain.

A further object of my invention is to provide a tractor hitch and automatic clutch release of such a character readily attachable in conjunction with the tractor drawbar more particularly a draw bar of the U shaped type without alteration in the tractor structure, and in addition to provide a spring held clutch release arm independently operative, and an automatic manually releasable catch for the arm to lock the clutch lever in released position until the catch has been disengaged by the operator.

With the above and other objects in view which will be made apparent in the accompanying description my invention resides in the combination of parts and elements hereinafter more particularly described and claimed, reference being had to the accompanying drawing, wherein like characters of reference indicate like parts throughout the different views and wherein:

Fig. 1 is a perspective view of my improved tractor hitch and clutch release in operative attachment to a tractor sufficient of the latter being shown to illustrate the attachment and operation of the device.

Fig. 2 is a perspective view of the tractor hitch and clutch release illustrated with the tractor hitch tensioned as under an abnormal pulling strain and the release arm engaged in clutch release position.

Fig. 3 is a detail perspective view of the catch for the clutch release arm.

Fig. 4 is a detail view of the standard for the tractor hitch together with a fragment of the draw bar and bracket.

Having reference to the accompanying drawing 1 indicates generally the tractor structure, 2 a fender of the tractor, 3 the clutch lever and 4 the draw bar for attachment of a trailer implement, the draw bar being of a U shaped type. Slidable on the draw bar 4, transversely disposed, is a slide bar 5 notched at the extremities as indicated at 6 for sliding engagement of the parallel arms of the draw bar. Bolted or similarly secured to the rear cross section of the draw bar 4 is a bracket 7 formed of a section of channel iron disposed with its legs turned rearward. Mounted on the slide bar 5 is a standard, generally indicated at 8, which consists of a hollow shank portion 9 (see Figure 4) in which is disposed a bolt 10 having its outer end secured by a lock nut 11 and provided with a further nut 12 for retaining the standard fixed in intimate contact with the slide bar 5. The standard 8 is further provided with an upstanding arm 13 with opening 14 to which pivotally attaches a forked double eye coupling 15.

Mounted in suitable aligned openings in the bracket 7 and slide bar 5, slidable in the said bracket, is a U-shaped shackle or clevis 16 which is formed with threaded shanks secured to the slide bar 5 by nuts 16' and on the arms or shanks of which, interposed between bracket and slide bar, are coiled springs 17—17. The said springs would be suitable to resist a normal pull on the clevis in accordance with the load capacity desired but contracting to predetermined limits when an abnormal pulling strain is imposed on the clevis by the trailing implement. The bolt 10 is dimensioned extending rearward beyond the shank portion 9 with its head normally spaced from the bracket 7 but upon contraction of the springs 17—17 under an abnormal strain the head of the bolt would be brought into contact with the bracket 7 limiting such contraction or tensioning of the springs.

In the coupling 15 is mounted in a suitable opening therein a bolt 18 with its shank rearwardly extending. Pivoted on a pin 19 which is vertically mounted secured to the frame structure of the tractor, is a link 20 formed of a flat bar twisted to provide an arm slidably mounted on the bolt 18 and restricted by a nut 21, and having its other arm pivotally mounted on a pin 22 in the forked head of a bolt 23 the shank of which is slidable in a suitable opening through a bracket 24 depending from the clutch release arm 25 integrally formed therewith, the said bolt being restricted as to movement by a nut 26.

The clutch release arm 25 is slidable in an approximate horizontal plane through a bracket 27 secured to the tractor structure and terminates in an elongated eye 28 engaging the clutch lever 3. The clutch release arm is held normally inoperative to actuate the clutch lever by a spring 29 attaching to the release arm and to a bracket 30 secured to the fender 2 of the tractor structure.

On an upstanding lug 31 on the bracket 27 is pivoted a catch 32 by provision of depending ears as indicated at 33 pivoting on a transverse pin 34. Between a rearward extension 35 of the bracket 27 and the rear arm of the catch 32 is interposed a spring 36 secured to bracket and catch and tensioned to depress the toe 37 of the catch. On the clutch release arm 25 is a notch 38 for engagement of the toe 37 to lock the release arm in a forward position.

In the operation of the device the parts are arranged to automatically operate upon an abnormal strain being applied to the tractor hitch to actuate the clutch lever 3 and release the engine clutch. When the shackle 16 has an abnormal strain imposed on it by its attached implement, such as a plow or the like, encountering an obstruction, the slide bar 5 is drawn rearward in opposition to the springs 17—17 moving the standard 8 and through the connecting link 20 carrying the clutch release arm 25 forward to actuate the clutch lever 3 and release the clutch. When so forwardly positioned the arm 25 is locked by engagement of the toe 37 of the catch 32 in the notch 38 until manually released by the operator.

With the tractor stopped and the strain relieved from the shackle the springs 17—17 would restore the slide 5 to its normal position such action being inoperative to affect the release arm 25 by virtue of the sliding engagement of the link 20 with the bolt 18 and the similar engagement of the bolt 23 with the depending bracket 24 on the clutch release arm, such engagement being restricted to the one direction only.

Upon release of the catch 32 the arm 25 would be moved back to its normal position by the spring 29 freeing the clutch lever.

In the clutch release arm 25 is shown a curved section as indicated at 39 which is provided for avoidance of an obstructing hub on the tractor structure, such obstruction being common on certain types of tractors. Obviously considerable structural alterations in the device would be required to accommodate it to the different tractor structures but such variations would necessarily be only in the nature of changes in the details of construction without alteration in the general principles of construction and operation of the device.

The device affords a great convenience in tractor operation particularly in plowing and like work eliminating the necessity for the driver to leave his seat during operations and further affording protection against breakage of either tractor or implement when an obstruction is encountered.

Having thus described my invention what I claim is:—

1. In combination with a tractor having a clutch lever and a substantially U shaped drawbar, a clutch release arm engaging the clutch lever, and a tractor hitch on the draw bar comprising a slide bar transversely disposed and slidable longitudinally of the drawbar, a shackle engaging the slide bar and longitudinally slidable on the drawbar, springs on the shackle tensioned by pull applied thereto, a standard provided with a hollow shank portion, a bolt through the shank portion engaging the slide bar and rearwardly extending to limit the rearward movement of the slide bar by making contact with the end portion of the draw bar; and a pivotally mounted link loosely engaging the standard and clutch release arm arranged to release the clutch upon an abnormal pull being applied to the shackle.

2. In combination with a tractor having a clutch lever and a substantially U shaped drawbar, a spring held clutch release arm engaging the clutch lever, a manually releasable spring actuated catch automatically engaging the clutch release arm when said arm has been actuated to release the clutch, and a tractor hitch on the drawbar comprising a slide bar, a shackle engaging the slide bar said shackle and slide bar being longitudinally movable on the drawbar, springs on the shackle tensioned by a pull applied thereto, a standard on the slide bar; and a pivoted mounted link loosely engaging the standard and clutch release arm and arranged under impulse of an abnormal pull applied to the shackle to actuate the clutch release arm to release the clutch and releasable to allow individual restoration of the clutch release arm and tractor hitch to their normal positions.

NICK JOHN GLABUS.